United States Patent
Wendel et al.

(10) Patent No.: US 10,831,907 B2
(45) Date of Patent: Nov. 10, 2020

(54) TECHNIQUE FOR POSITION CALCULATION OF A RECEIVER VIA USE OF ENCRYPTED SIGNALS OF A PUBLIC REGULATED SERVICE

(71) Applicant: Airbus DS GmbH, Taufkirchen (DE)

(72) Inventors: Jan Wendel, Munich (DE); Alexander Ruegamer, Nuremberg (DE)

(73) Assignee: AIRBUS DS GMBH, Taufkirchen (DE)

( * ) Notice: Subject to any disclaimer, the term of this patent is extended or adjusted under 35 U.S.C. 154(b) by 145 days.

(21) Appl. No.: 15/621,485

(22) Filed: Jun. 13, 2017

(65) Prior Publication Data
US 2017/0364690 A1 Dec. 21, 2017

(30) Foreign Application Priority Data
Jun. 17, 2016 (EP) .................................. 16175002

(51) Int. Cl.
*G06F 21/60* (2013.01)
*G01S 19/05* (2010.01)
*G01S 19/25* (2010.01)
*G01S 19/01* (2010.01)
G01S 5/00 (2006.01)
G01S 19/30 (2010.01)

(52) U.S. Cl.
CPC ............ *G06F 21/606* (2013.01); *G01S 19/01* (2013.01); *G01S 19/05* (2013.01); *G01S 19/25* (2013.01); G01S 5/0036 (2013.01); G01S 19/30 (2013.01)

(58) Field of Classification Search
CPC ......... G06F 21/606; G01S 19/01; G01S 19/25
USPC ........................................................ 380/255
See application file for complete search history.

(56) References Cited

U.S. PATENT DOCUMENTS

| | | | | | |
|---|---|---|---|---|---|
| 5,825,887 | A | * | 10/1998 | Lennen | G01S 19/05 380/34 |
| 5,952,960 | A | * | 9/1999 | Lennen | G01S 19/05 342/357.69 |
| 6,404,801 | B1 | * | 6/2002 | Lennen | G01S 19/05 375/134 |
| 6,417,800 | B1 | * | 7/2002 | Valio | G01S 19/25 342/357.23 |

(Continued)

FOREIGN PATENT DOCUMENTS

| | | |
|---|---|---|
| EP | 2682785 | 1/2014 |
| EP | 2746810 | 6/2014 |
| EP | 2799907 | 11/2014 |

OTHER PUBLICATIONS

European Search Report, dated Dec. 7, 2016, priority document.

*Primary Examiner* — Teshome Hailu
(74) *Attorney, Agent, or Firm* — Greer, Burns & Crain, Ltd.

(57) ABSTRACT

A method for determining a position of a receiver via use of encrypted signals of a public regulated service. The method comprises transmitting PRN code chips to the receiver by an assistance server. The method further comprises storing the transmitted PRN code chips to be used before a designated time interval by the receiver. The method further comprises receiving the encrypted signals during the designated time interval by the receiver from satellites in line-of-sight to the receiver. The method further comprises determining the position of the receiver via use of the encrypted signals and the stored PRN code chips by the receiver.

8 Claims, 3 Drawing Sheets

(56) References Cited

U.S. PATENT DOCUMENTS

| | | | |
|---|---|---|---|
| 2003/0151547 A1 | 8/2003 | Mauro et al. | |
| 2009/0207951 A1* | 8/2009 | Kim | G01S 19/30 |
| | | | 375/343 |
| 2014/0009336 A1 | 1/2014 | Ruegamer et al. | |
| 2014/0040338 A1* | 2/2014 | Van Der Sluis | H04L 9/0866 |
| | | | 708/254 |
| 2014/0354473 A1* | 12/2014 | Wallner | G01S 19/01 |
| | | | 342/357.51 |
| 2016/0327025 A1* | 11/2016 | Noto | F03D 7/047 |

* cited by examiner

TECHNIQUE FOR POSITION CALCULATION OF A RECEIVER VIA USE OF ENCRYPTED SIGNALS OF A PUBLIC REGULATED SERVICE

CROSS-REFERENCES TO RELATED APPLICATIONS

This application claims the benefit of the European patent application No. 16175002.1 filed on Jun. 17, 2016, the entire disclosures of which are incorporated herein by way of reference.

BACKGROUND OF THE INVENTION

The present disclosure generally relates to a method for determining a position of a receiver via use of encrypted signals of a public regulated service. Further, the present invention relates to a receiver and an assistance server. The present invention refers to the technical field of global navigation satellite systems, for example GPS and Galileo.

Global navigation satellite systems, abbreviated GNSS, offer in general two different services. First, signals of an open service can be received, acquired and tracked by a receiver, such as in standard user equipment, which is able to receive and process these signals. This allows the user equipment to calculate a position. Examples for such an open service are the Galileo Open Service, abbreviated OS, and the GPS CA on a L1 carrier. Second, public regulated services are only provided to authorized users. At present, examples are Public Regulated Service, abbreviated PRS, or signals like GPS M-Code and P(Y) Code signals.

In order to restrict access to the public regulated services to only authorized users, Pseudo Random Noise (PRN) ranging codes and navigation messages modulated onto satellite transmitted signals are encrypted. An authorized user requires a security module and valid keys in order to be able to decrypt the navigation messages and generate the PRN ranging codes which match the PRN ranging codes transmitted by the satellites. Therefore, replicas are generated which correlate with the received satellite signals. The correlation of locally generated replicas with the received satellite signals is the basis of an acquisition technique, tracking technique, and measurement of the time of flight of the satellite signals for the distance between a satellite and the receiver. The time of flight of the satellite signals can be converted into a pseudo range measurement, and with at least four pseudo range measurements, the authorized user is provided with sufficient information to calculate the user equipment's position. Additional constraints enable the user to calculate the user equipment's position with less than four pseudo range measurements. In any case, this calculation, which is usually referred to the user equipment's receiver antenna position, is only possible, if the satellites' positions at the time of transmission are known. The satellites' positions can be calculated from Ephemeris data, which is basically information on the satellites' orbits. The Ephemeris data is included in the navigation messages, which also include additional corrections, for example a satellite clock error. The satellite clock error is due to the satellite's atomic clock experiencing noise and clock drift errors. The navigation messages contain corrections for these errors and estimates of an accuracy of the atomic clock.

The navigation messages cannot be decrypted without a security module and valid keys and replicas according to the PRN ranging codes cannot be generated. Consequently, a use of public regulated services is not possible. A security module is highly complex, power consuming, and needs to be handled according to its security classification. Thus, the need for a security module and valid keys is a complication for the use of the public regulated services, which limits a range of applications. Especially for Galileo PRS, users exist, for which the use of the Galileo PRS service would be beneficial. These users could be authorized to use the authorized service, but who cannot fulfil the requirements resulting from the need for a security module inside a receiver of the user equipment and for handling valid keys, for example PRS keys.

An assistance server for access to public regulated services can contain one or more security modules and is appropriately keyed, while the receiver does not have a security module or in the case of Galileo PRS, PRS keys. Basically, two groups of architectures regarding the assistance server can be distinguished as follows.

In the first group, the assistance server provides via a communication link PRN code chips to a receiver, which enables the receiver to generate required replicas in order to correlate the required replicas with the received satellite signals and finally calculate a position. Information included in the encrypted navigation messages of the public regulated service is provided via the communication link. Access control to the public regulated service is also enforced via the communication link. Receivers which shall be excluded from a usage of the public regulated service are excluded from reception of the information from the assistance server by appropriate means.

In the second group, the receiver provides samples of a received signal to the assistance server. The assistance server calculates a position from these samples by use of its own security module and valid keys and further sends this position back to the receiver. The access control to the public regulated service is enforced via the communication link. Receivers that shall be excluded from the usage of the public regulated service do not receive the position from the assistance server.

A major drawback of both groups of architectures is that always a communication link between the assistance server and the receiver is required. Especially for the second group of architectures, the bandwidth requirements for this communication link can be demanding. Furthermore, a certain delay between validity and availability of the position solution is unavoidable.

SUMMARY OF THE INVENTION

Therefore, it is an object of the present invention to avoid a need for a security module and valid keys inside a receiver and enabling access to public regulated services for a wider range of user groups, without jeopardizing security of the public regulated service.

In a first aspect, a method for determining a position of a receiver via use of encrypted signals of a public regulated service is provided. The method comprises transmitting Pseudo Random Noise (PRN) code chips to a receiver by an assistance server. The method further comprises storing the transmitted PRN code chips to be used for a designated time interval by the receiver. The method further comprises receiving the encrypted signals during the designated time interval by the receiver from satellites in line-of-sight to the receiver. The method further comprises determining the position of the receiver via use of the encrypted signals and the stored PRN code chips by the receiver.

The designated time interval may be understood as a time interval in the future, for example a future time interval. This can be a time interval separated from the time the step of storing takes place. Determining a position may be understood as calculating a position. The receiver may be comprised in a user equipment, such as a mobile phone. The assistance server can further be a part of the public regulated service. The assistance server can further receive PRN code chips and encrypted navigation messages from the satellites. The transmitted PRN code chips to be used for a designated time interval may be understood as using the transmitted PRN code chips during a later time interval, such as a future time interval or a desired time interval. The encrypted signals can comprise PRN code chips and encrypted navigation message symbols.

The advantage of the method according to the first aspect is an on time measurement without the need for a communication link to the assistance server. Encrypted navigation message symbol borders have to be respected in an underlying correlation between locally generated replicas corresponding to the stored PRN code chips and the encrypted signal. According to the first aspect, the encrypted navigation message symbols can be recovered after the step of correlating. However, without a security module and valid keys, the receiver is not able to decrypt the navigation message. Therefore, security is preserved.

The PRN code chips transmitted by the assistance server can be stored for a predetermined number of partial time periods of the designated time interval. The partial time period can be smaller than the designated time interval. The PRN code chips transmitted by the assistance server can further be stored to be used for a predetermined number of partial time periods of the designated time interval.

This has the advantage of a reduction of required storage in the receiver.

The step of transmitting can comprise transmitting information on the designated time interval. The transmitted information can further be encrypted.

This has another advantage of fulfilling a security function in order to prevent decryption by unauthorized users.

The PRN code chips transmitted by the assistance server can be multiplied with encrypted navigation message symbols. The encrypted navigation message symbols can extend beyond a plurality of single chips of the PRN code chips.

The method can further comprise transmitting, by an assistance server, PRN code chips and encrypted navigation message symbols to a receiver. The method can further comprise storing, by the receiver, the transmitted PRN code chips and encrypted navigation message symbols to be used for a designated time interval. The method can further comprise receiving the encrypted signals, by the receiver from satellites in line-of-sight to the receiver, during the designated time interval. The method can further comprise determining the position of the receiver, by the receiver, via use of the encrypted signals, and the stored PRN code chips and encrypted navigation message symbols.

This has the advantage that no navigation message symbol borders have to be respected in the correlation between the locally generated replica according to the PRN code chips and the encrypted navigation message symbols. This enables arbitrary correlation times without the need to consider message symbol borders. Extending the correlation time increases sensitivity of the receiver, for example this can allow an operation with lower carrier-to-noise-density ratios, as long as correlation loss due to Doppler error is sufficiently small.

The PRN code chips transmitted by the assistance server can be multiplied with a binary sequence. Each value of the binary sequence can extend beyond a plurality of single chips of the PRN code chips.

A single chip can be understood as a binary value which begins with a falling/rising edge and ends with the next respective rising/falling edge. This binary sequence can further include Ephemeris and satellite clock corrections.

The encrypted signals can be received by the receiver during the designated time interval from a predetermined number of satellites. The predetermined number of satellites can be smaller than the number of satellites being in line-of-sight to the receiver. The encrypted signals can be broadcasted or transmitted from the predetermined number of satellites or satellites being in line-of-sight to the receiver.

This has the advantage of using different channels, for example public service channels and public regulated service channels individually or in combination. This might be the case when the assistance server is not universally available. The receiver can then calculate the position via use of open services.

The stored PRN code chips and/or encrypted navigation message symbols can match PRN code chips and/or encrypted navigation message symbols included in the encrypted signals.

The step of determining the position of the receiver can be performed during the designated time interval. The step of determining the position of the receiver can further be delayed with respect to the receiving step. The step of determining the position of the receiver can further be performed after the designated time interval.

This has the advantage of having an exact measurement without the need for a connection to the assistance server. The receiver then is able to adapt to surrounding circumstances.

In a second aspect, a computer program implements a method according to the first aspect.

According to a third aspect, a storage device stores a computer program according to the second aspect.

In a fourth aspect, a receiver for determining its position via use of encrypted signals of a public regulated service is provided. The receiver comprises a first receiving unit adapted to receive Pseudo Random Noise (PRN) code chips from an assistance server. The receiver further comprises a storing unit adapted to store the transmitted PRN code chips to be used for a designated time interval. The receiver further comprises a second receiving unit adapted to receive the encrypted signals from satellites in line-of-sight to the receiver during the designated time interval. The receiver further comprises a position determining unit adapted to determine the position of the receiver via use of the encrypted signals and the stored PRN code chips.

The first and second receiving units can be the same receiving unit or separated from each other.

In a fifth aspect, an assistance server for supporting determination of a position of a receiver via use of encrypted signals of a public regulated service is provided. The assistance server comprises a transmitting unit adapted to transmit Pseudo Random Noise (PRN) code chips to the receiver. The receiver is enabled to store the transmitted PRN code chips to be used for a designated time interval. The receiver is further enabled to receive the encrypted signals from satellites in line-of-sight to the receiver during the designated time interval. The receiver is further enabled to determine the position of the receiver via use of the encrypted signals and the stored PRN code chips.

Even if some of the foregoing aspects are described in respect to the method, these aspects can further apply to the receiver and the assistance server as well.

DETAILED DESCRIPTION OF THE PREFERRED EMBODIMENTS

Figure 1:
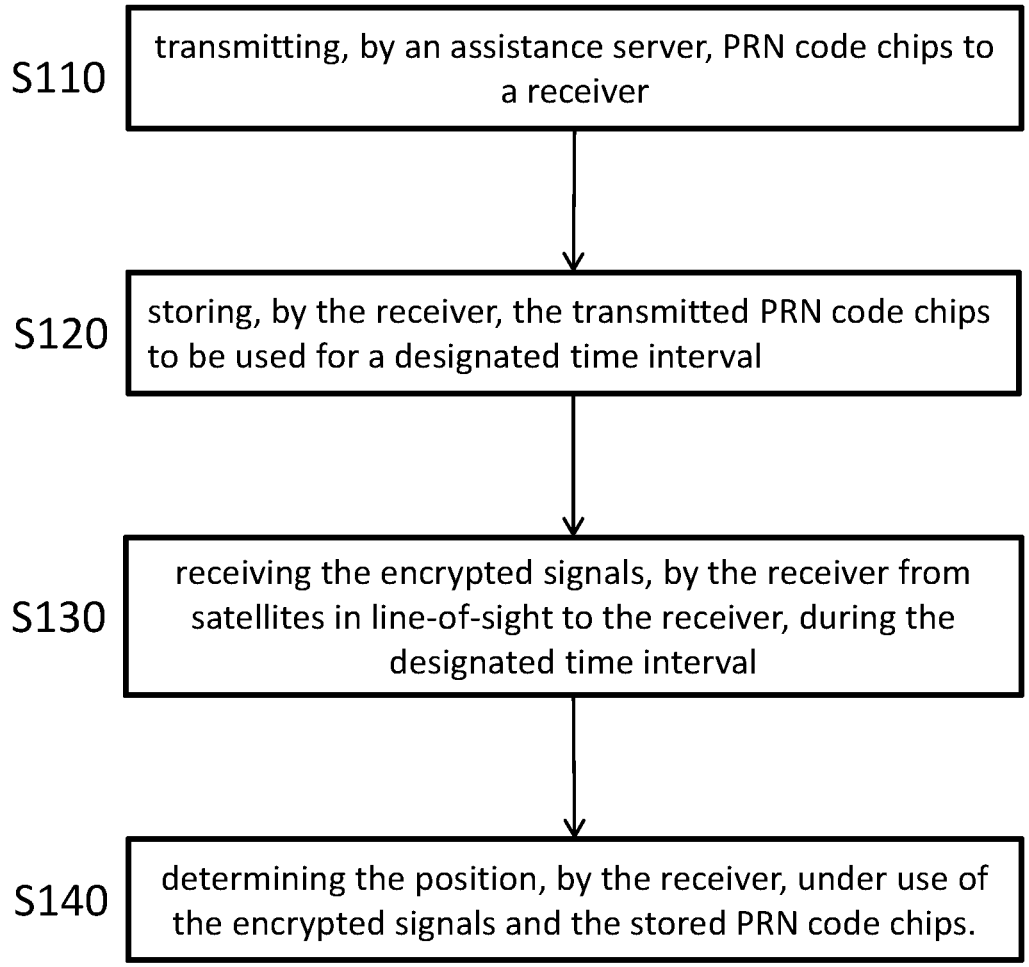
FIG. 1 is a schematic illustration of a method according to an embodiment of the present invention.

FIG. 1 schematically illustrates a method according to an embodiment of the present invention. An assistance server transmits PRN code chips to a receiver in step S110. Then the receiver stores the transmitted PRN code chips to be used for a designated time interval in step S120. Then the receiver receives the encrypted signals transmitted or broadcasted from satellites in line-of-sight to the receiver during the designated time interval in step S130. Then the receiver determines its position via use of the encrypted signals and the stored PRN code chips in step S140. The method according to an embodiment of the present invention can further be illustrated in a scenario illustrated in FIG. 2.

Figure 2:
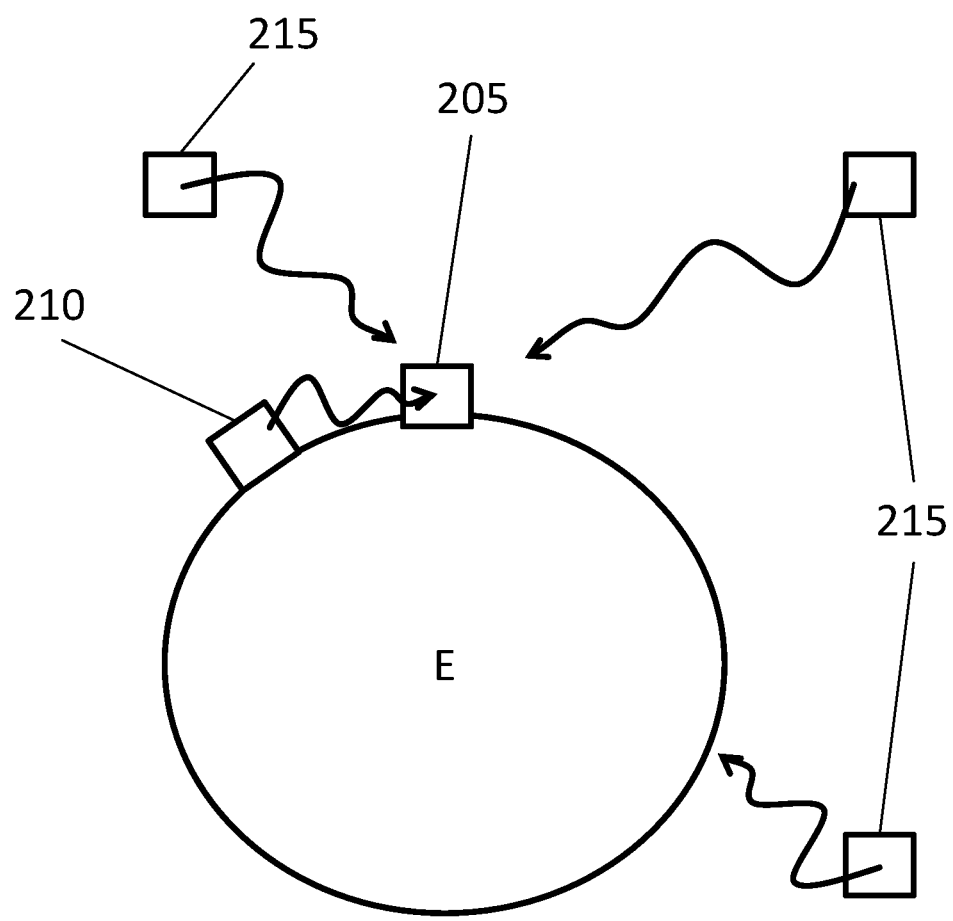
FIG. 2 is a schematic illustration of a scenario according to an embodiment of the present invention.

FIG. 2 schematically illustrates a scenario according to the method illustrated in FIG. 1. The assistance server 210 transmits PRN code chips to the receiver 205. The receiver 205 receives satellite signals from a plurality of satellites 215. These satellite signals comprise encrypted signals. The receiver 205 receives the encrypted signals from the plurality of satellites 215 in line-of-sight to the receiver during a designated time interval. Therefore, the receiver 205 has stored the transmitted PRN code chips transmitted by the assistance server 210 earlier. Only the line-of-sight satellites 215 from the plurality of satellites 215 are considered for determining the position of the receiver. This is illustrated in FIG. 2 as the third satellite 215 below the horizon is not able to transmit a signal to the receiver 205. Also, the earth E is not drawn to scale for matter of illustration. As the last step, the receiver 205 determines its position via use of the encrypted signals transmitted by the satellites and the stored PRN code chips transmitted by the assistance server. This can be done during the designated time interval. Further, it is possible that the assistance server 210 transmits encrypted navigation message symbols which can be used during the step of position calculation in the correlation process for longer correlation times.

Figure 3A:
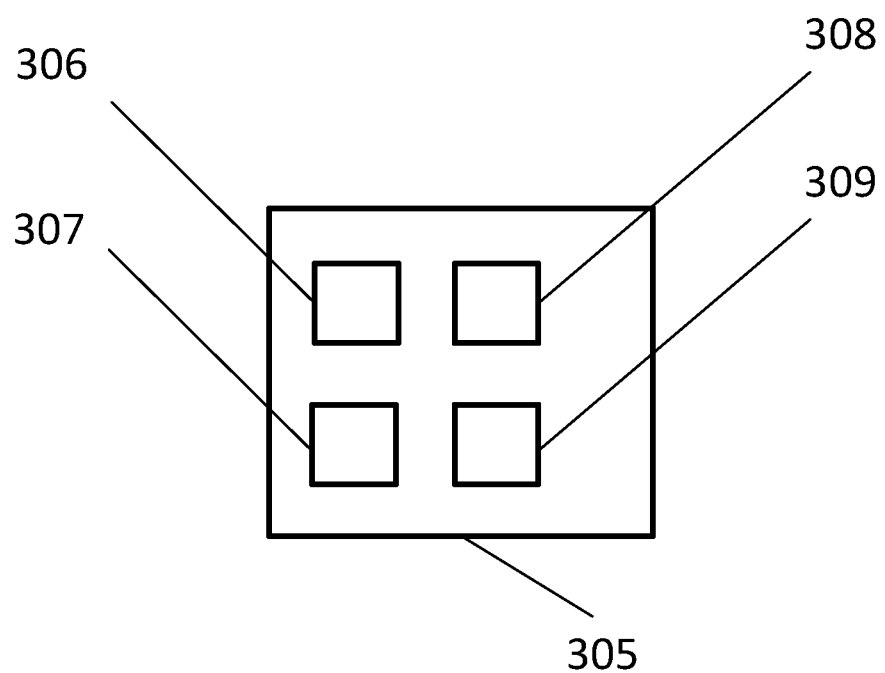
FIG. 3a is a schematic illustration of a receiver according to an embodiment of the present invention.

FIG. 3a schematically illustrates a receiver 305 according to an embodiment of the present invention. The receiver 305 comprises a first receiving unit 306, a storing unit 307, a second receiving unit 308 and a position determining unit 309. The first receiving unit 306 can receive PRN code chips from an assistance server. The storing unit is adapted to store the transmitted PRN code chips to be used for a designated time interval. The second receiving unit 308 is adapted to receive, from satellites in line-of-sight to the receiver, the encrypted signals during the designated time interval. The position determining unit 309 is adapted to determine the position of the receiver 305 via use of the encrypted signals and the stored PRN code chips. The first receiving unit 306 and the second receiving unit 308 can be the same receiving unit. Usually, the first receiving unit 306 and the second receiving unit 308 are not the same. This is due to the fact that the assistance server has other connection requirements via the first receiving unit 306. Further, the first receiving unit 306 and the second receiving unit 308 can be the same or different, using different frequency carriers for reception.

Figure 3B:
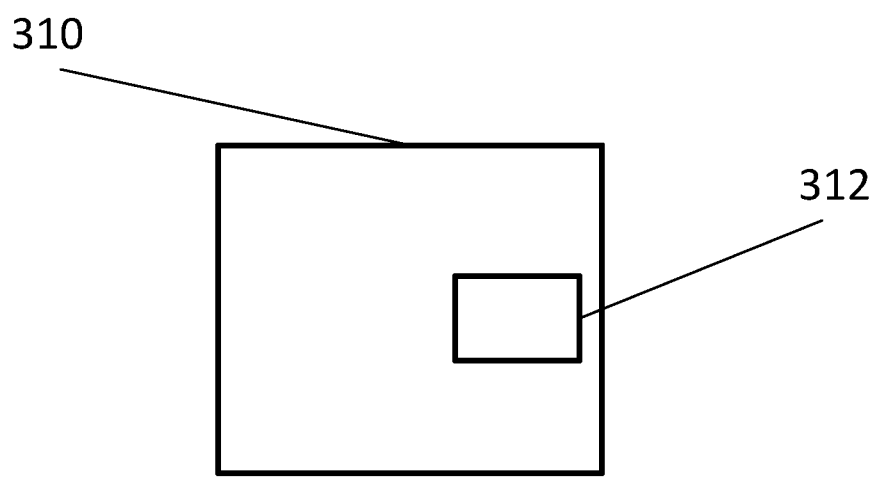
FIG. 3b is a schematic illustration of an assistance server according to an embodiment of the present invention.

FIG. 3b schematically illustrates an assistance server 310 according to an embodiment of the present invention. The assistance server 310 is provided for supporting determination of a position of a receiver via use of encrypted signals of a public regulated service. The assistance server 310 comprises a transmitting unit 312 adapted to transmit PRN code chips to a receiver. The receiver then stores the transmitted PRN code chips to be used for a designated time interval. The receiver then receives the encrypted signals from satellites in line-of-sight to the receiver during the designated time interval. The receiver then determines the position of the receiver via use of the encrypted signals and the stored PRN code chips. The assistance server 310 can be part of the public regulated service. The assistance server 310 can further be adapted to communicate with the satellite. Even the satellites can be adapted to transmit encrypted signals to the assistance server, which is then able to decrypt the encrypted signals. The transmitted signals from the satellites can then further be transmitted from the assistance server 310 to the receiver.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for determining a position of a receiver via use of encrypted signals of a public regulated service, the method comprising:

transmitting, by an assistance server, a plurality of Pseudo Random Noise, PRN, code chips and encrypted navigation message symbols to the receiver;

storing, by the receiver, the PRN code chips and encrypted navigation message symbols transmitted by the assistance server to be used for a predetermined number of partial time periods of a designated future time interval, wherein the PRN code chips transmitted by the assistance server are stored for the predetermined number of partial time periods of the designated future time interval, wherein each of the predetermined number of partial time periods is one of a plurality of partial time periods that are smaller than the designated future time interval;

receiving the encrypted signals, by the receiver, from satellites in line-of-sight to the receiver, during the designated time interval; and determining the position of the receiver, by the receiver, via use of the encrypted signals and the stored PRN code chips and encrypted navigation message symbols during the designated future time interval.

2. The method according to claim 1, wherein the step of transmitting comprises transmitting information on the designated time interval, wherein the transmitted information is encrypted.

3. The method according to claim 1, wherein the PRN code chips transmitted by the assistance server are multiplied with encrypted navigation message symbols, wherein the encrypted navigation message symbols extend beyond a plurality of single chips of the PRN code chips.

4. The method according to claim 3, wherein at least one of the stored PRN code chips or navigation message symbols match PRN code chips or navigation message symbols included in the encrypted signals.

5. The method according to claim 1, wherein the PRN code chips transmitted by the assistance server are multiplied with a binary sequence, wherein each value of the binary sequence extends beyond a plurality of single chips of the PRN code chips.

6. The method according to claim 1, wherein the encrypted signals are received by the receiver during the designated time interval from a predetermined number of satellites being smaller than the number of the satellites being in line-of-sight to the receiver.

7. A receiver for determining a position of the receiver via use of encrypted signals of a public regulated service, the receiver comprising:
a first receiving unit adapted to receive a plurality of Pseudo Random Noise, PRN, code chips and encrypted navigation message symbols from an assistance server;
a storing unit adapted to store the PRN code chips and encrypted navigation message symbols transmitted by the assistance server to be used for a predetermined number of partial time periods of a designated future time interval, wherein the storing unit is adapted to store the PRN code chips transmitted by the assistance server for the predetermined number of partial time periods of the designated future time interval, wherein each of the predetermined number of partial time periods is one of a plurality of partial time periods that are smaller than the designated future time interval;
a second receiving unit adapted to receive the encrypted signals from satellites in line-of-sight to the receiver during the designated time interval; and
a position determining unit adapted to determine the position of the receiver via use of the encrypted signals and the stored PRN code chips and encrypted navigation message symbols during the designated future time interval.

8. An assistance server for supporting determination of a position of a receiver via use of encrypted signals of a public regulated service, the assistance server comprising:
a transmitting unit adapted to transmit a plurality of Pseudo Random Noise, PRN, code chips and encrypted navigation message symbols to the receiver enabling the receiver to store the transmitted PRN code chips and encrypted navigation message symbols to be used for a predetermined number of partial time periods of a designated future time interval and store the transmitted PRN code chips for the predetermined number of partial time periods of the designated future time interval, to receive the encrypted signals from satellites in line-of-sight to the receiver during the designated time interval, and to determine the position of the receiver via use of the encrypted signals and the stored PRN code chips and encrypted navigation message symbols during the designated future time interval, wherein each of the partial time periods is one of a plurality of time periods that are smaller than the designated time interval.

* * * * *